United States Patent Office 3,524,887
Patented Aug. 18, 1970

3,524,887
PROCESS FOR PREPARING SOLID SODIUM 2-HYDROXYETHYL MERCAPTIDE
John C. Summers, Wilmington, Del., assignor to E. I. du Pont de Nemours and Company, Wilmington, Del., a corporation of Delaware
No Drawing. Filed Jan. 12, 1968, Ser. No. 697,312
Int. Cl. C07c *149/18*
U.S. Cl. 260—609          8 Claims

ABSTRACT OF THE DISCLOSURE

Process for preparing solid sodium 2-hydroxyethyl mercaptide from the aqueous molten salt, an antioxidant such as sodium sulfite being optionally present, by rapid crystallization which is favored by controlling the water to sodium 2-hydroxyethyl mercaptide molar ratio between 1.5–2.5 to 1. The solid obtained is then stabilized to reduce the hygroscopic nature of the final product.

BACKGROUND OF THE INVENTION

This invention relates to an improved process for preparing solid sodium 2-hydroxyethyl mercaptide.

Sodium 2-hydroxyethyl mercaptide is recognized to be an effective cleaning agent for removing the oxygen containing tarnish from metals. Presently sodium 2-hydroxyethyl mercaptide is prepared in solution by reacting equivalent amounts of 2-mercaptoethanol and sodium hydroxide in water. This solution is evaporated to dryness in a vacuum to produce a viscous liquid which often requires days to crystallize as solid 2-hydroxyethyl mercaptide. This method although time consuming and uneconomic has been the only feasible method for obtaining this product prior to this invention.

The process of this invention fills the need for a more desirable route to solid sodium 2-hydroxyethyl mercaptide by providing a method for rapidly crystallizing sodium 2-hydroxyethyl mercaptide from solution. While the material is frequently used as a solution, it is desirous to have a solid product for shipping and thereby avoid the costs of shipping large quantities of water.

SUMMARY OF THE INVENTION

The process of this invention provides an improved method for preparing solid, substantially free flowing, particulate sodium 2-hydroxyethyl mercaptide. I have found it is critical that from 0.5 to 1.5 molar equivalents of water be added to the reaction of 2-mercaptoethanol with sodium hydroxide to supplement the equivalent of water formed during reaction in order to permit a reasonable reaction rate and even more importantly to allow rapid crystallization of sodium 2-hydroxyethyl mercaptide. When from 0.5 to 1.5 molar equivalents of water is added to the system, solid sodium 2-hydroxyethyl mercaptide can be rapidly formed and readily crystallized by methods such as gradual cooling, stirring, seeding or contacting a cold surface.

The crystals so obtained are hygroscopic and can be stabilized by exposure to an environment in which the relative humidity fluctuates to above and below a 20% relative humidity as temperature changes.

I have also discovered that the process of my invention can be used when an antioxidant such as sodium sulfite is desired in the final product. Up to one molar equivalent of sodium sulfite can be added to the 2-hydroxyethyl mercaptide system without a significant adverse effect upon crystallization. The sodium sulfite and the 2-sodium hydroxyethyl mercaptide can then be crystallized as a mixture by the methods described above.

DESCRIPTION OF THE INVENTION

Essentially, this invention is an improvement in the production of solid sodium 2-hydroxyethyl mercaptide from an aqueous system. I have found it to be critical to the operation of the process of this invention that from 0.5 to 1.5 molar equivalents of water be added to the system when 2-mercaptoethanol is neutralized with sodium hydroxide to form sodium 2-hydroxyethyl mercaptide. Control of the water content of the system within this range results in ready formation of sodium 2-hydroxyethyl mercaptide and, even more importantly, allows this product to be easily precipitated from the system.

In the preparation of sodium 2-hydroxyethyl mercaptide, 2-mercaptoethanol is neutralized with an approximately equivalent amount of either aqueous or solid sodium hydroxide which forms equivalents of sodium 2-hydroxyethyl mercaptide and water. Therefore, when I speak of adding from 0.5 to 1.5 molar equivalents of water to this system, I mean that a sufficient amount of water is added to bring the total water present in the system to from 1.5 to 2.5 molar equivalents of sodium 2-hydroxyethyl mercaptide. It is preferred that the total water present in the system is about 2.25 equivalents, as this results in the near optimum concentration for rapid formation and even more importantly crystallization of sodium 2-hydroxyethyl mercaptide.

This crystallization can be accomplished satisfactorily by gradual cooling, but it is preferred to use a technique which will result in more rapid crystallization. For exampje, methods such as stirring, rapid cooling, seeding and contacting the solution with a cold surface can be employed.

Total water in the 1.5 to 2.5 molar equivalent range is necessary to allow rapid formation and even more importantly rapid crystallization of sodium 2-hydroxyethyl mercaptide. When less than 0.5 molar equivalent of water is added to the system, formation of sodium 2-hydroxyethyl mercaptide is slow, even in the molten phase at favored elevated reaction temperatures, and the system is too viscous and crystallization by gradual cooling is impaired. I have also found that the addition of greater than 1.5 molar equivalents of water results in a system which is too dilute to readily crystallize.

My process has the further advantage of being operable even when small amounts of 2,2'-thiodiethanol are present in the system. As 2,2'-thiodiethanol is a major impurity in crude 2-mercaptoethanol, this means that my process can be advantageously used even when 2-mercaptoethanol of the highest purity is not available.

When the crystallization is performed in an atmosphere having a relative humidity of greater than twenty percent, the crystals formed tend to be hygroscopic. This problem of hygroscopicity can be reduced by treating the crystals for 1 to 5 days in an environment in which the relative humidity is first increased above the 20% level and then decreased below this level. This stabilization process can be accelerated by employing a cyclic humidity temperature conditioning system consisting of alternately decreasing and increasing the relative humidity environment in conjunction with a concurrent decreasing and increasing temperature.

I have also discovered that the process of my invention can be employed to prepare a mixture of solid sodium 2-hydroxyethyl mercaptide and solid antioxidant. Preferably, the antioxidant is sodium sulfite. With the presence of an antioxidant such as sodium sulfite in the composition, atmospheric oxidation and reduction reactions are greatly reduced thereby enhancing the stability and usefulness of the sodium 2-hydroxyethyl mercaptide. Up to one molar equivalent of sodium sulfite can be added to the solution and crystallized along with the sodium 2- hydroxyethyl mercaptide. Preferably about 0.8 mole equivalents of sodium sulfite will be added.

The following examples are presented in order that my invention may be better understood. The parts and percentages are by weight unless otherwise indicated.

EXAMPLE 1

Into a suitable container 230 parts water and 390 parts sodium hydroxide is added in portions to 780 parts 2-mercaptoethanol while the temperature of the system is maintained below 75° C. Then 1000 parts sodium sulfite is added and the temperature of the system is maintained at 55° C.

This system is then cooled and with vigorous stirring crystallization begins in about 15 minutes at which time the temperature is about 45° C. Crystallization continues for 4 hours, with a large portion of this time being required to dissipate the heat of crystallization. The resultant solid sodium 2-hydroxyethyl mercaptide, sodium sulfite mixture has a M.P. of 37–52° C.

EXAMPLE 2

To 39 parts 2-mercaptoethanol is added in portions 19 parts flake sodium hydroxide and 9 parts water. During this addition, the temperature of the system is maintained below 60° C. Complete solution is obtained in less than ½ hour. Sodium sulfite (50 parts) is added and the mixture is heated at 60° C. for 15 minutes. The reaction mixture is then poured into a container which is at room temperature and a solid sodium 2-hydroxyethyl mercaptide, sodium sulfite mixture which melts at 39° to 54° C. crystallizes within four hours.

EXAMPLE 3

To 39 parts 2-mercaptoethanol is added in portions 19 parts flake sodium hydroxide and 13.5 parts water. During the addition, the temperature of the system is maintained below 60° C. After solution is completed, 50 parts of sodium sulfite is added and the reaction system is heated at 60° C. for 15 minutes. The reaction mixture is then poured into a container which is at room temperature and the mixture crystallizes to a hard solid, M.P. 34–41° C., in about 7 hours.

EXAMPLE 4

To 195 parts 2-mercaptoethanol is added in portions 40 parts water and 97.5 parts sodium hydroxide. During this addition, the temperature of the system is maintained below 70° C. The system is then cooled with ice. Crystallization begins within 1 hour and is complete within 3 hours. The result is crystalline sodium 2-hydroxyethyl mercaptide, M.P. 40–46° C.

I claim:

1. In a process for preparing solid sodium 2-hydroxyethyl mercaptide from a mixture of near equivalents of 2-mercaptoethanol and sodium hydroxide in an aqueous system, the improvement comprising controlling the total water content of the system to from 1.5 to 2.5 molar equivalents of water per mole of sodium 2-hydroxyethyl mercaptide and then crystallizing solid sodium 2-hydroxyethyl mercaptide from the system.

2. The process of claim 1 wherein from 0–1 molar equivalents of sodium sulfite per equivalent of sodium 2-hydroxyethyl mercaptide is added to the system.

3. The process of claim 1 wherein the sodium 2-hydroxyethyl mercaptide is removed from the reaction system by rapid crystallization.

4. The process of claim 1 wherein the total water content of the system is 2.25 molar equivalents of water per mole of sodium 2-hydroxyethyl mercaptide.

5. The process of claim 4 wherein the sodium 2-hydroxyethyl mercaptide is removed from the reaction system by rapid crystallization.

6. The process of claim 4 wherein crystallization is accomplished by contacting the system with a cold surface.

7. The process of claim 4 wherein crystallization is accomplished by seeding.

8. In a process for preparing solid sodium 2-hydroxyethyl mercaptide from a mixture of near equivalents of 2-mercapto ethanol and sodium hydroxide in an aqueous system, the improvement comprising controlling the total water content of the system to from 1.5 to 2.5 molar equivalents of water per mole of sodium 2-hydroxyethyl mercaptide and treating said sodium 2-hydroxyethyl mercaptide for 1 to 5 days by alternating the relative humidity of the environment of said sodium 2-hydroxyethyl mercaptide in a cycle in which said relative humidity is increased above 20% and then decreased below 20%.

References Cited

UNITED STATES PATENTS 3,086,997    4/1963    Warner _____ 260—609

CHARLES B. PARKER, Primary Examiner

D. R. PHILLIPS, Assistant Examiner